United States Patent [19]

Takei

[11] Patent Number: 5,510,837

[45] Date of Patent: Apr. 23, 1996

[54] AUTOMATIC EXPOSURE CONTROL DEVICE PERFORMING WEIGHTED LIGHT MEASUREMENT

[75] Inventor: Hirofumi Takei, Tokyo, Japan

[73] Assignee: Canon Kabushiki Kaisha, Tokyo, Japan

[21] Appl. No.: 299,818

[22] Filed: Sep. 1, 1994

Related U.S. Application Data

[63] Continuation of Ser. No. 231,448, Apr. 20, 1994, abandoned, which is a continuation of Ser. No. 959,175, Oct. 9, 1992, abandoned, which is a continuation of Ser. No. 846,744, Mar. 6, 1992, abandoned, which is a continuation of Ser. No. 633,972, Dec. 26, 1990, abandoned.

[30]     Foreign Application Priority Data

Dec. 28, 1989  [JP]  Japan ..................... 1-344803

[51] Int. Cl.⁶ ................ H04N 5/238; H04N 5/235
[52] U.S. Cl. .............. 348/362; 348/229; 348/363; 354/429; 354/432
[58] Field of Search .................. 354/402, 406, 354/412, 429, 430, 432, 431, 433; 348/221, 229, 362, 363; H04N 5/232, 5/238, 5/235

[56]     References Cited

U.S. PATENT DOCUMENTS

| | | | |
|---|---|---|---|
| 4,782,357 | 11/1988 | Hayakawa et al. | 354/432 |
| 4,969,005 | 11/1990 | Tokunaga | 354/432 |
| 4,969,045 | 11/1990 | Haruki et al. | 358/228 |
| 5,021,818 | 6/1991 | Satoh et al. | 354/429 |
| 5,049,997 | 9/1991 | Arai | 358/228 |

FOREIGN PATENT DOCUMENTS

| | | | |
|---|---|---|---|
| 1240082 | 9/1989 | Japan | H04N 5/238 |
| 032175 | 2/1991 | Japan | H04N 5/235 |
| 2219461 | 12/1989 | United Kingdom | H04N 5/238 |

*Primary Examiner*—Victor R. Kostak
*Assistant Examiner*—Glenton B. Burgess
*Attorney, Agent, or Firm*—Robin, Blecker, Daley and Driscoll

[57]     ABSTRACT

An automatic exposure control device comprising a light measuring circuit for performing a weighted light measurement for a light measuring area set in a predetermined position within an image sensing plane, a discrimination circuit for detecting and evaluating the level of a luminance component in a video signal in each of a plurality of detecting areas set within the image sensing plane and for discriminating a photographic state while tracking a subject, and a compensation circuit for compensating a light measurement control signal produced by the light measuring circuit in accordance with a discriminating result made by the discriminating circuit.

26 Claims, 7 Drawing Sheets

AUTOMATIC EXPOSURE CONTROL DEVICE PERFORMING WEIGHTED LIGHT MEASUREMENT

This is a continuation application under 37 CFR 1.62 of prior application Ser. No. 08/231,448, filed Apr. 20, 1994, now abandoned; which is a continuation of Ser. No. 07/959,175, filed Oct. 9, 1992 (now abandoned), which is a continuation of Ser. No. 07/846,744, filed Mar. 6, 1992 (now abandoned), which is a continuation of Ser. No. 07/633,972, filed Dec. 26, 1990 (now abandoned).

BACKGROUND OF THE INVENTION

1. Field of the Invention

This invention relates to automatic exposure control devices suited to be used in video cameras, etc.

2. Description of the Related Art

In video cameras, to keep exposures always at an optimum, provision is made for automatically controlling the exposure.

The conventional automatic exposure control devices generally have functions of controlling the iris of the optical system so that the video signal at the output takes a constant level and of controlling the level of the video signal. As the light measuring circuit for controlling the iris and the video signal level, it has been the common practice to use a circuit for averaging the luminance of the entirety of an image sensing plane. In lighting situations having a large luminance difference between a subject and its background, however, for the backlighting case, the subject is blackened. For the frontlighting case, the subject is washed out. In both cases, unnatural pictures result. To avoid this, a method has been proposed that a portion of the image sensing plane, for example, a central portion in which the subject falls with a high probability, is framed for light measurement, and is weightily measured for the luminance of the interior of that frame. In this light measuring method, the position of the light measuring frame is fixed relative to the image sensing plane. It will hereinafter be called the "fixed-frame weighted light measurement" method.

Figure 1:
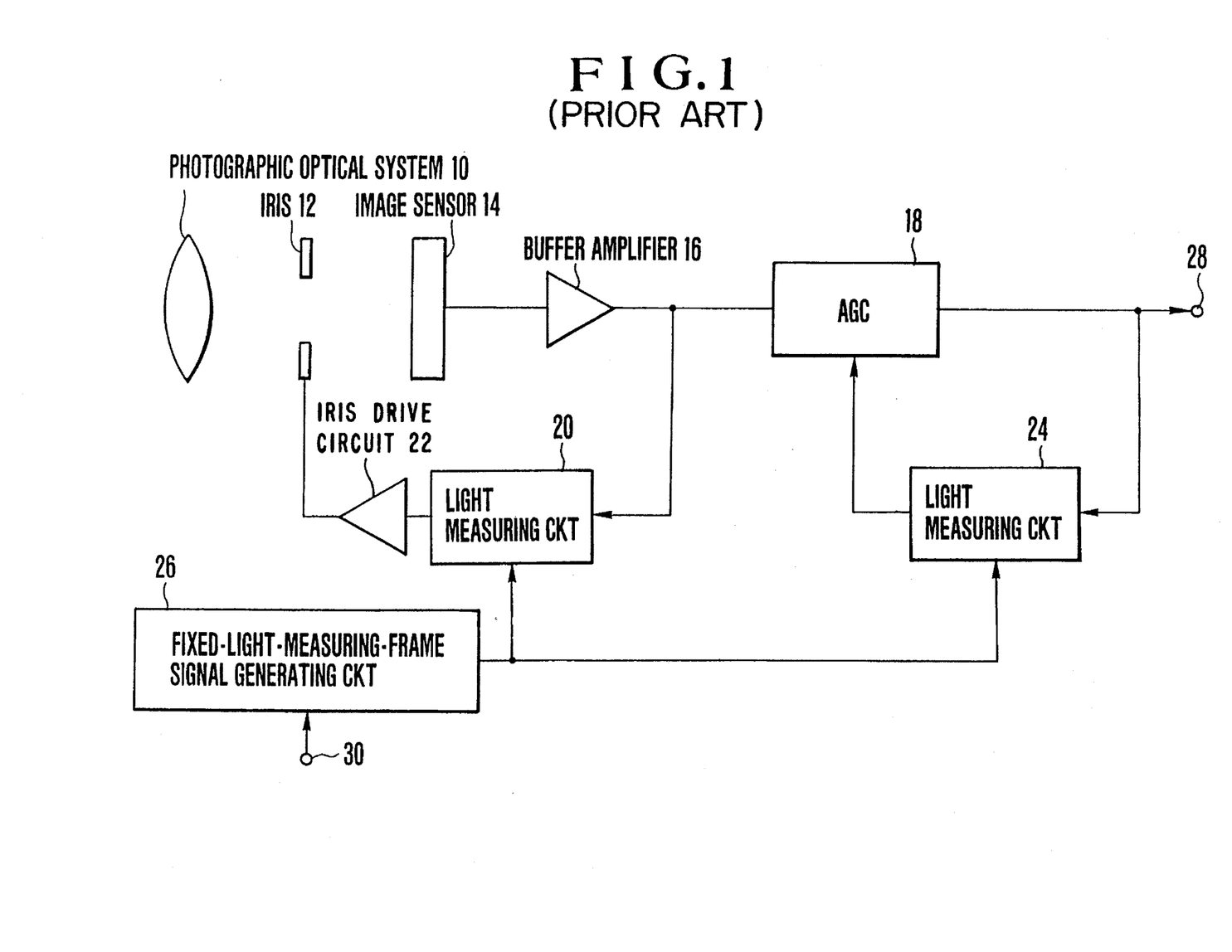
FIG. 1 is a block diagram of an example of the commonly available automatic exposure control device.

FIG. 1 in block diagram shows the construction and arrangement of the prior known automatic exposure control device employing the fixed-frame weighted light measurement method in the video camera commonly available for home use. Light entering through a photographic optical system 10 is regulated in intensity by an iris 12, before reaching an image sensor 14. The device further comprises a buffer amplifier 16, an AGC (Automatic Gain Control) circuit 18, a light measuring circuit 20 for controlling the iris 12, an iris drive circuit 22 responsive to the output of the light measuring circuit 20 for moving the iris 12, another light measuring circuit 24 for controlling the gain of the AGC circuit 18, and a frame signal generating circuit 26 for producing a frame signal indicating the light measuring frame set by the first and second light measuring circuits 20 and 24. The video signal output appears at a terminal 28. A composite synchronizing signal is supplied from a terminal 30.

As is understandable from the above, the first light measuring circuit 20 controls the iris 12 by the iris drive circuit 22 so as to make constant the output level of the image sensor 14, while the second light measuring circuit 24 controls the gain of the AGC circuit 18 so as to make constant the output signal level of the AGC circuit 18.

Figure 2:
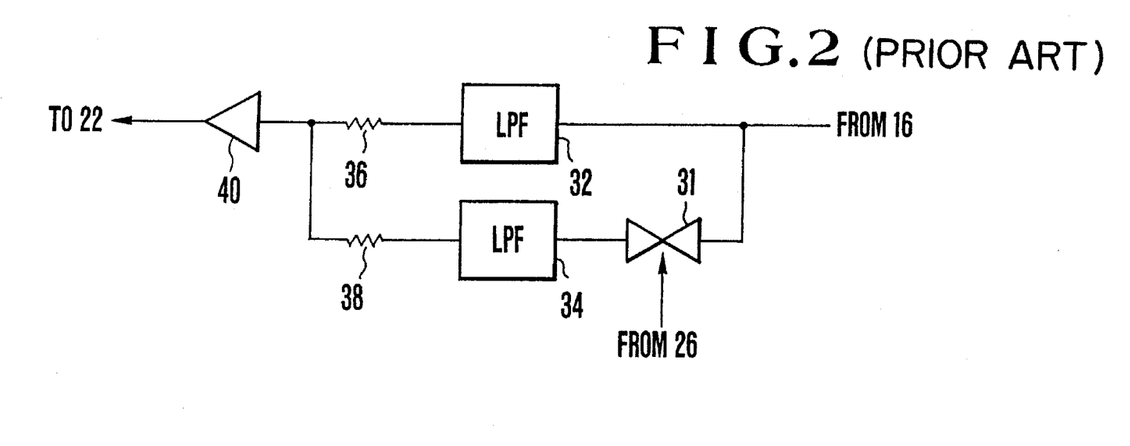
FIG. 2 is a block diagram illustrating the construction of the light measuring circuit in FIG. 1.

FIG. 2 shows an example of construction of the first light measuring circuit 20. The second light measuring circuit 24 also is similar in construction to it. The circuit 20 comprises an analog switch 31, two low-pass filters (LPF) 32 and 34, two resistors 36 and 38 and a buffer 40. The output of the buffer 16, or the video signal, is applied directly to the LPF 32 and, through the analog switch 31, to the LPF 34. The analog switch 31 is opened or closed under the control of the frame signal output from the frame signal generating circuit 26. For that part of the video signal which corresponds to the interior of the light measuring frame, the analog switch 31 comes into a closed state. In other words, the LPF 32 outputs an average signal on the whole image sensing plane, while the LPF 34 outputs an average signal in part of the image sensing plane, or in the light measuring frame. These average signals after having been weighted by the resistors 36 and 38 respectively are then added together and output from the buffer 40. As the weight laid on the output of the first LPF 32 increases, the device approaches the whole-image-sensing-plane average light measurement mode. As the weight laid on the output of the second LPF 34 increases, the device approaches the light-measuring-frame weighted light measurement mode.

Figures 3A, 3B, 3C:
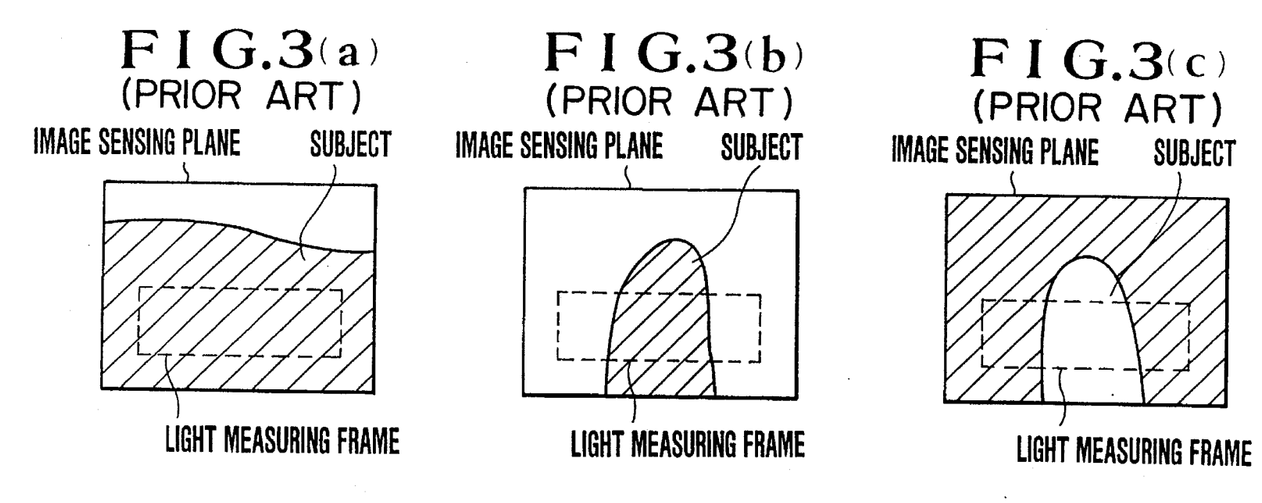
FIGS. 3(a), 3(b) and 3(c) are plan views for explaining the relationship of a subject with a fixed light measuring frame.

However, the above-described fixed-frame weighted light measurement method has the following problems. That is, the light measuring frame fails to be of the appropriate size to get only information about the whole subject. Since, in that method, however, the light measuring frame has its position fixed relative to the image sensing plane and its size remains constant, good versatility of the exposure control to all photographic situations cannot be realized. For example, in outdoor photography, the backlighting situation with the sky in the upper marginal zone of the image sensing plane is very often encountered. With regard to this, to avoid blackening of a subject as its luminance is weightily measured, the light measuring frame is desired to be wide in the lateral direction and large in size as shown in FIG. 3(a). For another subject of relatively small size as shown in FIG. 3(b), however, when backlighting occurs, the light measuring frame is partly occupied by the background of high luminance so that the average luminance rises greatly. Hence, blackening of the subject results.

Also, when over-frontlighting occurs as shown in FIG. 3(c), the background of low luminance enters the light measuring frame so that the average luminance is lowered, causing the subject to be washed out.

SUMMARY OF THE INVENTION

The present invention has been made to eliminate the above-described problems and its first object is to provide an automatic exposure control device which is able always to perform optimum exposure control regardless of the photographic situation.

A second object of the invention is to provide an automatic exposure control device capable of performing suitable exposure compensation by discriminating the given photographic situation so that a correct exposure can be made even in backlighting or over-frontlighting situations where the weighted light measurement method is liable to derive incorrect exposure values.

A third object of the invention is to provide an automatic exposure control device which makes exposure compensation optimum in such a way that the entire image sensing plane is divided into a plurality of areas and the magnitude of the luminance component of the video signal obtained from each of these areas is detected and evaluated so that while tracking change of the position of a subject, discrimination of the backlighting state or the over-frontlighting state is carried out, whereby even though the weighted light measurement method is used, no error occurs in judgment and it is, therefore, made possible to shoot any photographic situations with a correct exposure regardless of the direction of light to a subject of principal interest in backlighting photography or over-frontlighting photography.

To achieve such objects, according to the present invention, in a preferred embodiment thereof, an automatic exposure control device is disclosed comprising light measuring means for performing a weighted light measurement for a light measuring area set in a predetermined position within an image sensing plane, discriminating means for detecting and evaluating the level of a luminance component of a video signal in each of a plurality of detecting areas set within the image sensing plane and for discriminating a photographic state while tracking a subject, and compensating means for compensating a light measurement control signal produced by the light measuring means in accordance with a discrimination result made by discriminating means.

A fourth object of the invention is to provide an automatic exposure control device which enables, despite a change of the state of a subject, the exposure control to follow the subject with good stability.

A fifth object of the invention is to provide an automatic exposure control device which discriminates the state of a subject and is able to select the most suitable exposure control mode depending on that state.

To achieve such objects, according to the invention, in a preferred embodiment thereof, an automatic exposure control device is disclosed comprising light measuring means for performing a weighted light measurement for a light measuring area set in a predetermined position within an image sensing plane, discriminating means for discriminating a photographic state by evaluating the distribution of luminance signal levels on the image sensing plane, and compensating means for compensating a light measurement control signal produced by light measuring means in accordance with a discrimination result made by discriminating means, wherein compensating means is arranged such that a condition for transition to a compensation mode of compensating the light measurement control signal and a condition of releasing the compensation mode differ from each other.

A sixth object of the invention is to provide a video camera to which the above-described exposure control device is applied.

Other objects and features of the invention will become apparent from the following description in the specification and the accompanying drawings.

DETAILED DESCRIPTION OF THE PREFERRED EMBODIMENT

One embodiment of an automatic exposure control device according to the invention is described in great detail by reference to the drawings below.

Figure 4:
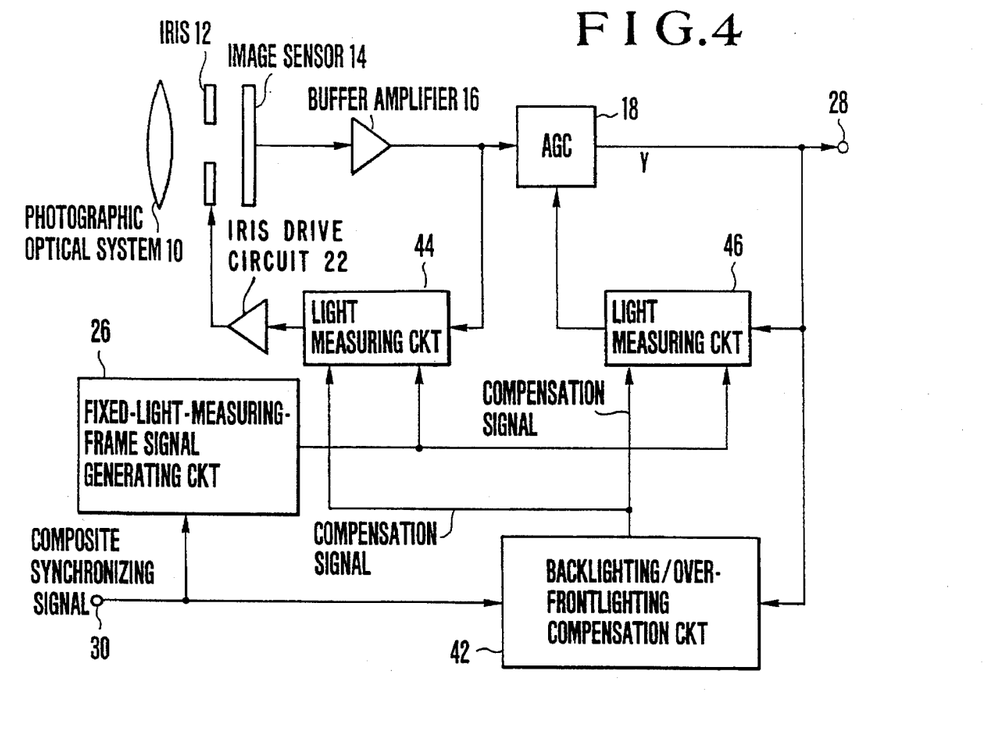
FIG. 4 is a block diagram of an embodiment of an automatic exposure control device according to the invention.

FIG. 4 in block diagram shows the construction of the automatic exposure control device in the invention. The same constituent parts as those of FIG. 1 are denoted by the same reference numerals, and their explanation is omitted.

In the same figure, a backlighting/over-frontlighting compensation circuit 42 discriminates and compensates the backlighting, over-frontlighting, and other lighting conditions of an image sensing plane. The interior of the image sensing plane is divided into a plurality of areas according to a composite synchronizing signal. Based on the luminance information of each of the divided areas, the position of the subject in the image sensing plane is substantially tracked to allow the luminance information in that position to be detected accurately. This is then computed with the luminance information of the background by a predetermined formula. Thus, the circuit 42 produces a compensation signal for compensating the measured value of light, as will be more fully described later.

Responsive to the fixed-frame signal output from the light-measuring-frame signal generating circuit 26 for setting a fixed light measuring area (light measuring frame) on the image sensing plane and the compensation signal output from the backlighting/over-frontlighting compensation circuit 42, a light measuring circuit 44 performs a light measurement based on the output level of the buffer amplifier 16. Another light measuring circuit 46 which performs a light measurement based on the output signal level of the AGC circuit 18, is substantially similar in construction to the first light measuring circuit 44.

Next, the operation of the automatic exposure control device shown in FIG. 4 is described. Light from a subject to be photographed enters the photographic optical system 10 and, after the amount of light is limited by the iris 12, focuses itself on an image sensing plane of the image sensor 14. The output of the image sensor 14 is applied through the buffer amplifier 16 to the AGC circuit 18 and the light measuring circuit 44. The output of the AGC circuit 18 is supplied from the video signal output terminal 28 to a video signal processing circuit (not shown). The output of the AGC circuit 18 is applied also to the light measuring circuit 46 and the backlighting/over-frontlighting compensation circuit 42. Based on the fixed-frame signal output from the fixed-light-measuring-frame signal generating circuit 26 and the compensation signal output from the backlighting/over-frontlighting compensation circuit 42, the light measuring circuits 44 and 46 detect the input luminance signal levels, the light measuring circuit 44 controlling the size of aperture opening of the iris 12 through the iris drive circuit 22, and the light measuring circuit 46 controlling the gain of the AGC circuit 18. By this, the video signal level is kept constant. It is to be noted that, in some cases, the so-called gamma processing circuit is connected between the buffer amplifier 16 and the AGC circuit 18. Still, in general, the signal level is controlled by such a loop of the iris control and the AGC control as has been described above.

Figure 5:
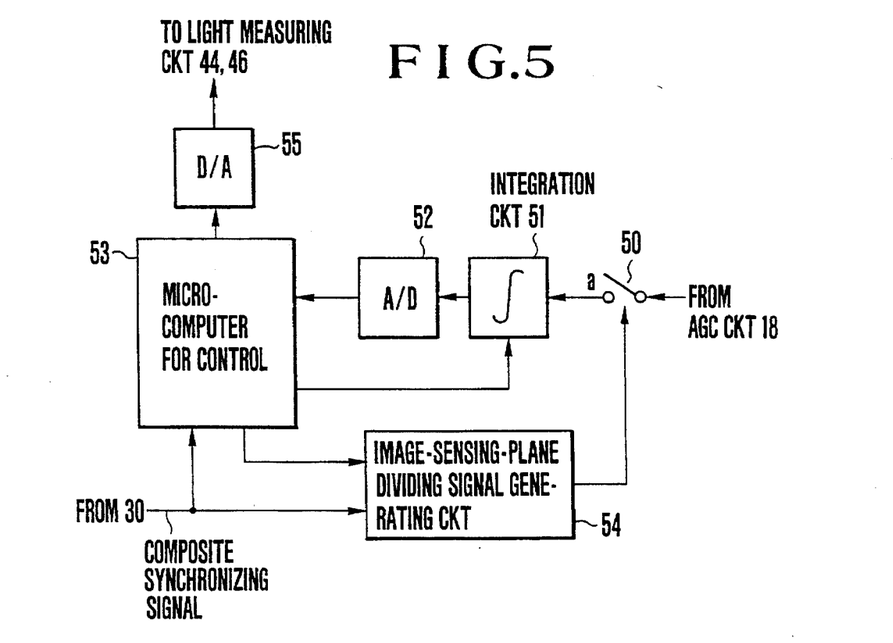
FIG. 5 is a block diagram illustrating the construction of the backlighting/over-frontlighting compensation circuit in FIG. 4.

The details of the construction of a specific example of the backlighting/over-frontlighting compensation circuit 42 are shown in FIG. 5. In the same figure, the video signal output from the AGC circuit 18 is applied through a gate switch 50 to an integration circuit 51. An A/D converter 52 converts the output of the integration circuit 51 into digital values which are supplied to a microcomputer 53. The microcomputer 53 takes in the output of the A/D converter 52 by every one field (image sensing plane), and resets the integration circuit 51 in periods of one field. A control operation of the microcomputer 53, as will be more fully described later, is to divide the image sensing plane into a plurality of areas. For this purpose, the microcomputer 53 supplies a dividing position signal representing the position where the image sensing plane is divided to an image-sensing-plane dividing signal generating circuit 54. From this dividing position signal and the composite synchronizing signal of the video signal received at the input terminal 30, the image-sensing-plane dividing signal generating circuit 54 produces an image-sensing-plane dividing signal for controlling the opening and closing of the gate switch 50. Thereby, for those portions of the video signal which correspond to the inside of the divided frames, the switch 50 is closed as it is connected to its "a" contact. For those portions of the video signal which correspond to the outside of the divided frames, it is opened as it is not connected to its "a" position. Therefore, the integration circuit 51 can integrate only the video signal level corresponding to the inside of the divided frames. From the integration information of the inside of each divided frame, the microcomputer 53 discriminates the image sensing plane between the backlighting and over-frontlighting states and outputs exposure compensation data to a D/A converter 55.

Figure 6A:
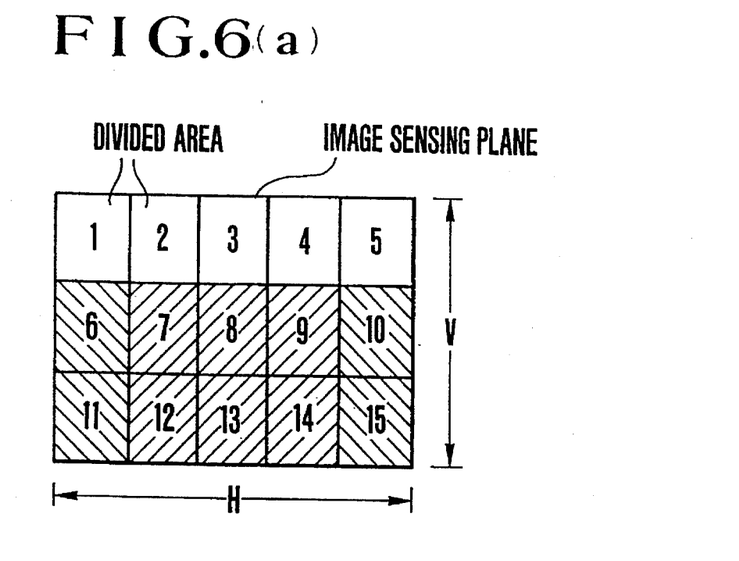
FIGS. 6(a), 6(b), 6(c), 6(d) and 6(e) are plan views for explaining the relationship of a subject with the divided areas in the image sensing plane.

Next, using FIG. 6(a), the operation of dividing the image sensing plane to a plurality of areas is described.

FIGS. 6(a) to 6(e) are taken to explain a case in which the image sensing plane is divided into 15 parts, and the level (integrated value) of luminance of each divided area is evaluated in discriminating the situation of the image sensing plane. In the order of numbers in FIG. 6(a), the entire area of the image sensing plane is divided for every one field. Here, the average value of the luminance signal levels in those portions of the video signal which are obtained from the divided areas 6, 10, 11 and 15 is used as the luminance level of the marginal portion of the subject being photographed. Also, one of the signal levels of the divided areas 7, 8, 9, 12, 13 and 14 at and near the center of the image sensing plane is used as the luminance level of the subject. Here, the reason why the luminance level values of the divided areas 1, 2, 3, 4 and 5 are not taken into consideration for the computation of the luminance level of the marginal portion of the subject is that the divided areas 1, 2, 3, 4 and 5 lie in the upper marginal zone of the image sensing plane. So, in ordinary photography, it often happens that the sky, the sun, or like objects of relatively high luminance fall in this zone. If they are taken into consideration, the luminance level of the marginal portion of the object would be frequently heightened. When detecting the backlighting state, which will be described more fully later, because the areas 1 to 5 have a high luminance, the photographing state would be mistaken for a backlighting state. So, this is considered to prevent an unnecessary compensation from occurring.

Next, the method of discriminating the backlighting state in the device of the invention is described. To discriminate the backlighting state, the luminance level $Y_{AVR}$ of the marginal portion of a subject of principal photographic interest and the luminance level $Y_{MIN}$ of the subject (where $Y_{MIN}$ is taken at the minimum among the values of the divided areas 7, 8, 9, 12, 13 and 14) are computed to obtain their difference $Y_{SUB}$ and their ratio $Y_{EV}$.

The relationships of these numerical values are expressed by equations as follows:

$$Y_{SUB} = Y_{AVR} - Y_{MIN} \qquad (1\text{-}1)$$

$$Y_{EV} = Y_{AVR} / Y_{MIN} \qquad (1\text{-}2)$$

And, in a case where the difference between $Y_{SUB}$ and the ratio $Y_{EV}$ exceed constant threshold values $Y_K$ and $E_K$ respectively, the photographing state of light is determined to be the backlighting state. This is expressed by the following equations:

$$Y_{SUB} = Y_{AVR} - Y_{MIN} \geq Y_K \qquad (2\text{-}1)$$

$$Y_{EV} = Y_{AVR} / Y_{MIN} \geq E_K \qquad (2\text{-}2)$$

Figure 7A:
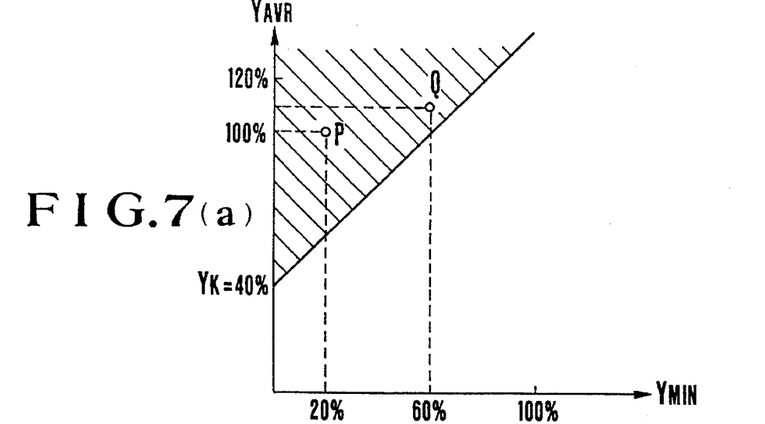
FIGS. 7(a), 7(b) and 7(c) are diagrams for explaining the operation of discriminating the photographic state, the operation of compensating for backlighting and the setting of its compensation area.
Figure 7B:
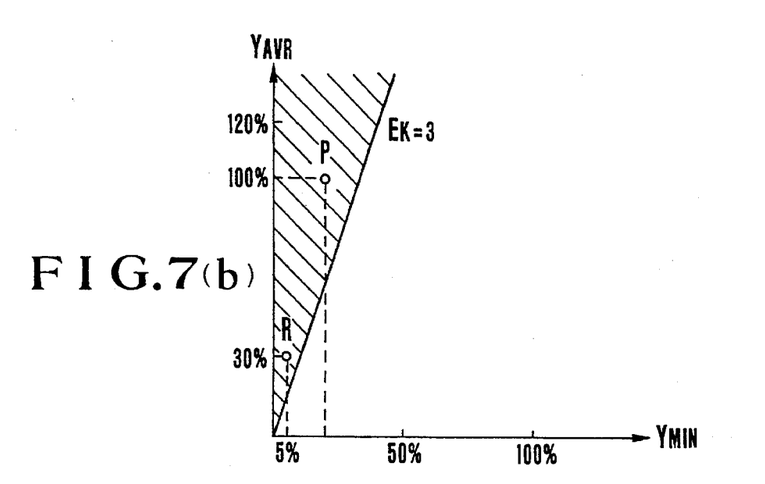
Figure 7C:
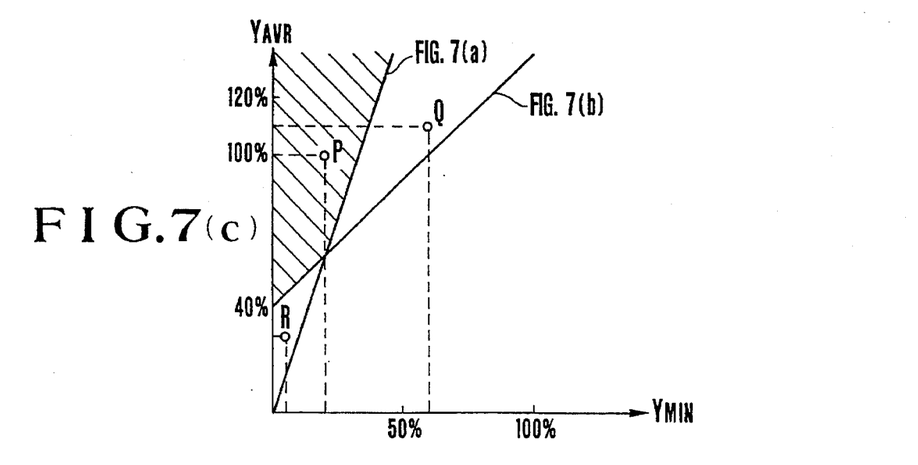

The reason why it is rather good to use both of these conditions in discriminating the backlighting state is explained by using FIGS. 7(a), 7(b) and 7(c).

At first, if it is judged that backlighting occurs only when the equation (2-1) is satisfied, the following drawback arises. Now assuming that the standard luminance level is 100%, and $Y_K = 40\%$, then a domain that satisfies the equation (2-1) takes place in a hatched area in the coordinates of FIG. 7(a). Here, with a subject having its $Y_{AVR}$ and $Y_{MIN}$ at a point P, because the subject luminance is low, or the $Y_{MIN}$ is 20%, it is better to judge that the subject is being backlighted. But, even for the same domain, with another subject having its $Y_{AVR}$ and $Y_{MIN}$ at a point Q, despite the high luminance of the subject at $Y_{MIN} = 60\%$, it is judged that the subject is backlighted. So, an unnecessary compensation for backlighting will follow. In some cases, therefore, the subject is washed out.

Next, if it is judged that backlighting occurs only when the equation (2-2) is satisfied, the following drawback arises. Now assuming that $E_K = 3$, then a domain that satisfies the equation (2-2) is shown by hatching in FIG. 7(b). Here, with a subject having its $Y_{AVR}$ and $Y_{MIN}$ at a point P, the luminance of the background is considerably higher than that of the subject. So, it is better to judge that the subject is backlighted likewise as in the case described above. But, even for the same domain, with another subject having its $Y_{AVR}$ and $Y_{MIN}$ at a point R, if, as $Y_{MIN} = 5\%$ and $Y_{MIN} = 30\%$ are both low, the subject is judged to be backlighted, there is a possibility of occurrence of a drop of the S/N, because the judgment of it as backlighting leads to an increase in the gain of the AGC circuit.

From the foregoing discussion, it is to be understood that discrimination of whether or not backlighting is occurring is made with a higher reliability when both of the equations (2-1) and (2-2) are considered, that is, their "and" condition is satisfied.

Figure 8A:
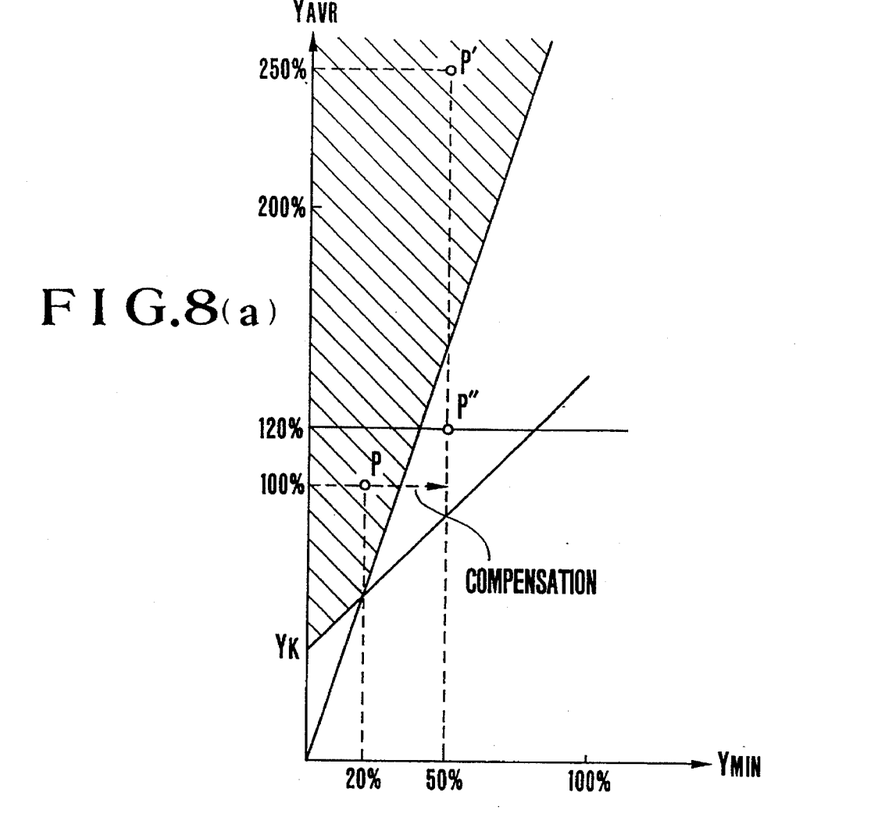
FIGS. 8(a) and 8(b) are diagrams for explaining the backlighting compensation area.
Figure 8B:
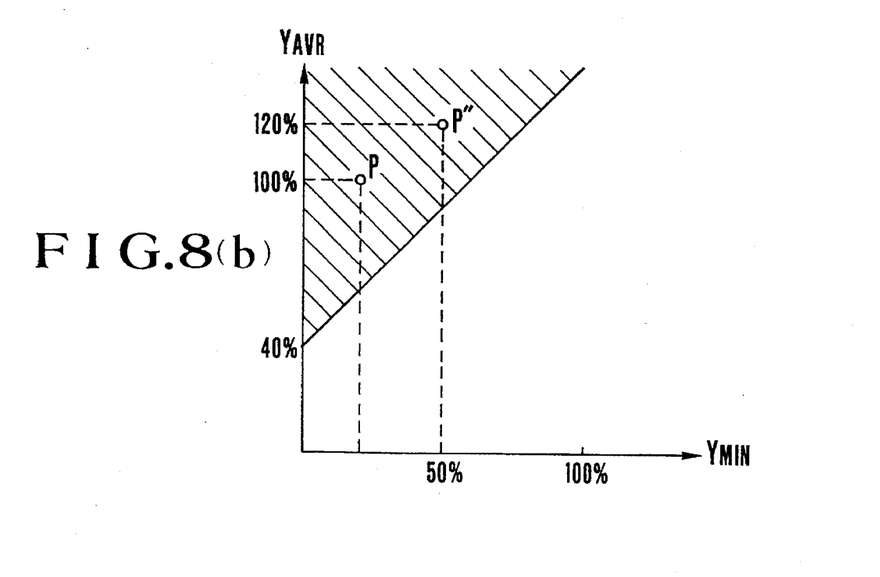

Further, preferably, the condition under which the compensation is brought into effect as the subject is judged to be backlighted and the condition under which the compensation is taken out of the action differ from each other. This reason is explained by using FIGS. 8(a) and 8(b). Suppose, as the subject having its $Y_{AVR}$ and $Y_{MIN}$ at the point P in FIG. 8(a) is judged to be in the backlighting situation, the compensation is performed by the iris and AGC circuit until the subject luminance $Y_{MIN}$ becomes 50%. In this case, in principle, because the $Y_{MIN}$ has changed from 20% to 50%, or 2.5 times in level, the value of $Y_{AVR}$ representing the background is presumed to change from 100% to 250% in level, thus changing the point P to a point P'. In fact, saturation occurs at about 120% due to the dynamic range of the image sensor or the like. Therefore, the $Y_{AVR}$ does not increase beyond 120%. For this reason, the point P becomes a point P''. Thus, the area for backlighting judgment is overstepped. Hence, the compensation for the backlighting is released and jump to the point P again occurs. As such a procedure repeats itself, hunting takes place in the control loop. Therefore, the image sensing plane is getting brighter and darker intermittently. Hence, the image quality is caused to deteriorate. To avoid this, the condition under which the compensation for backlighting is taken out of action after the device has entered the operation of compensating for backlighting is made different from the condition under which judgment of the occurrence of backlighting is carried out, as is expressed by the equation (2-1). By making such a provision, the point P'' obtained after the performance of the compensation for backlighting falls within the domain of the equation (2-1), as shown in FIG. 8(b). Hence, hunting can be prevented from occurring.

Figure 6B:
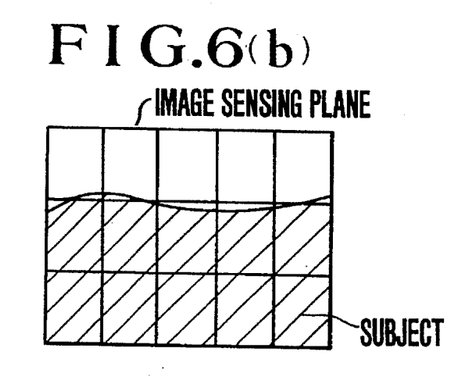

The above-described operation of the backlighting/over-frontlighting compensation circuit in the invention is by now summarized below. For example, in a situation where the sky occupies the image sensing plane only in part at the upper margin as shown in FIG. 6(b), because the level difference between the background luminance $Y_{AVR}$ and the subject luminance $Y_{MIN}$ does not increase too much, it is not judged as backlighting. So, backlighting compensation is not carried out.

Figure 6C:
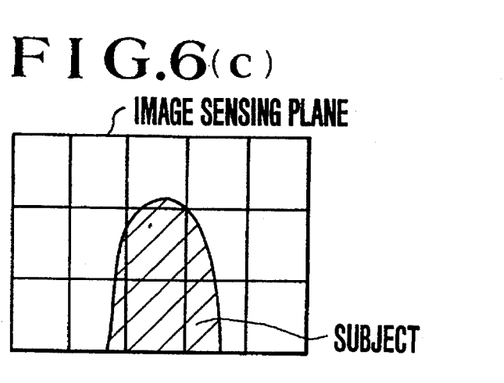

Conversely when the difference between $Y_{SUB}$ and the ratio $Y_{EV}$ of $Y_{AVR}$ and $Y_{MIN}$ increase above the constant threshold values $Y_K$ and $E_K$ respectively as in another situation of FIG. 6(c), it is judged as backlighting. The compensation signal is then applied to the light measuring circuits 44 and 46. The compensation for backlighting is carried out by controlling the the aperture opening of the iris 12 and the gain of the AGC circuit 18.

Figure 6D:
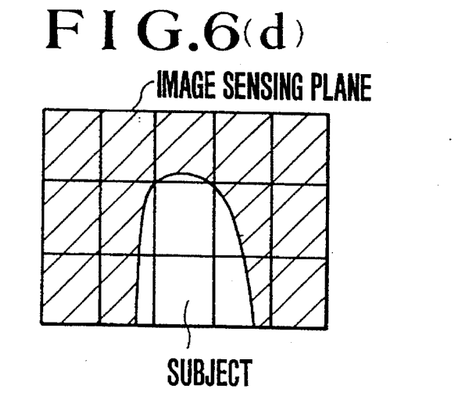

Meanwhile, another situation is judged as over-frontlighting when having a subject of such a size in such a position that, as shown in FIG. 6(d), the signal levels of the divided areas 6, 10, 11 and 15 are all low, and some of the signal levels of the divided areas 7, 8, 9, 12, 13 and 14 exceed the constant threshold values. In such a case, the compensation signal is applied to the light measuring circuits 44 and 46, by which the iris 12 and the AGC circuit 18 are controlled in the opposite direction to that when in the backlighting compensation. Thus, the over-frontlighting compensation is carried out by decreasing the amount of entering light.

Figure 6E:
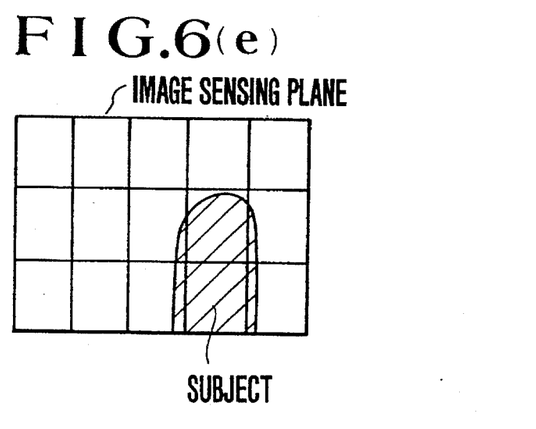

Also, even in another situation as resulting from moving of the subject to change its position within the image sensing plane as shown in FIG. 6(e), because the subject luminance $Y_{MIN}$ is defined as the minimum one of the values of the divided areas 7, 8, 9, 12, 13 and 14 (in this instance, the value of the divided area 14 is selected to be used as the $Y_{MIN}$), all what is needed is only to use a new luminance value of the subject as the $Y_{MIN}$ within the range of these divided areas. This suffices for the possibility of substantially tracking the moving subject. It is to be noted that this case is judged as a backlighting state similar to the backlighting state of FIG. 6(c), so compensation for backlighting is carried out by applying the compensation signal to the light measuring circuits 44 and 46. The tracking operation can be carried out in a similar manner to this even when an over-frontlighted subject is shot. In this case, the maximum one $Y_{MAX}$ of the signal levels of the divided areas 7, 8, 9, 12, 13 and 14 is compared always with a constant threshold value.

Figure 9:
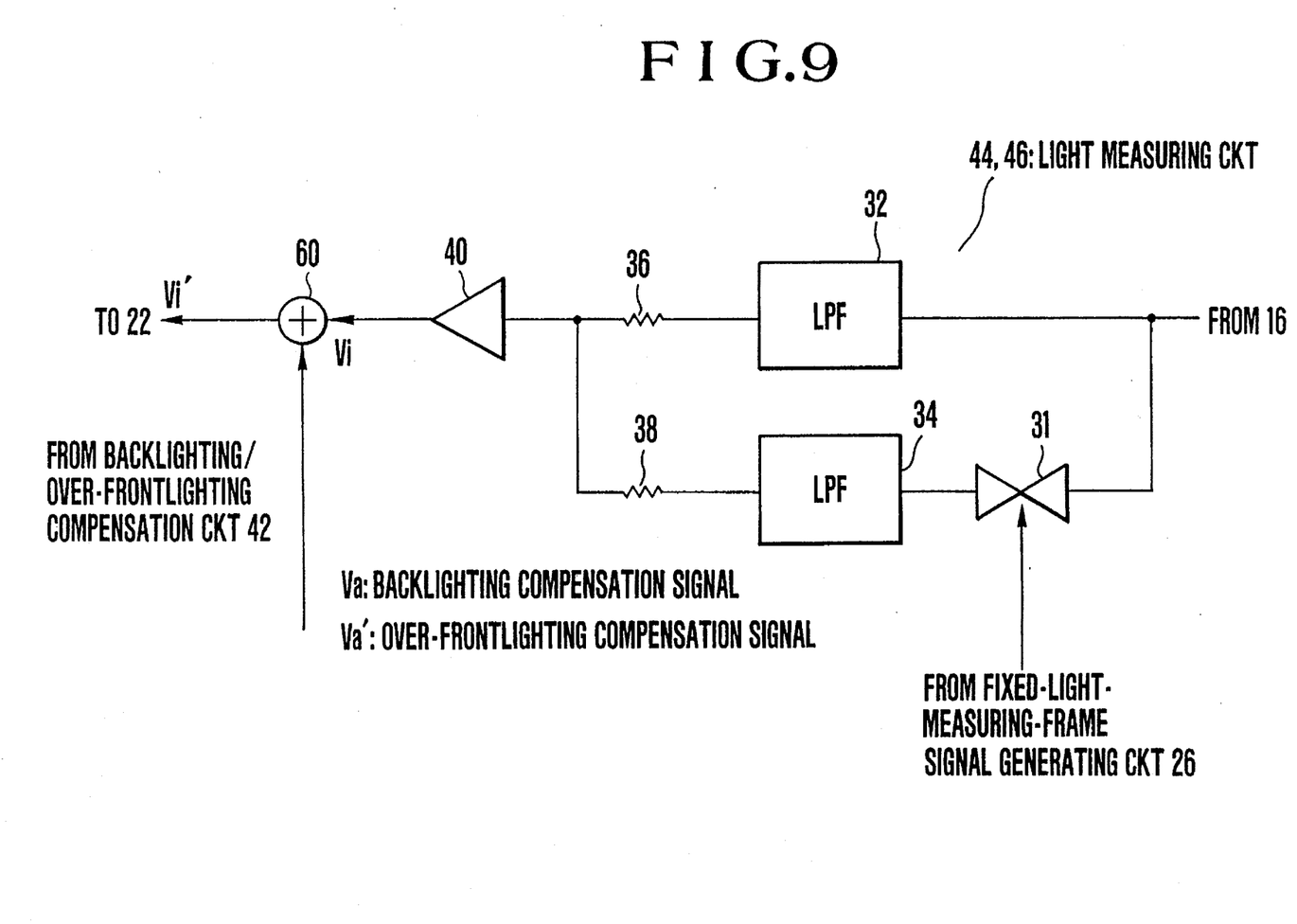
FIG. 9 is a block diagram illustrating the construction of the light measuring circuit.

Here, the construction of the light measuring circuit 44 is shown in the block diagram of FIG. 9. Since the construction of the other light measuring circuit 46, too, is similar to that of the light measuring circuit 44, description is given only of the light measuring circuit 44. In the same figure, reference numeral 60 denotes an adder. The construction of the light measuring circuits 44 and 46 resemble fundamentally the construction of FIG. 2. So, the elements having the same functions as those of the constituent elements of FIG. 2 are denoted by the same reference numerals. The compensation signal voltage from the backlighting/over-frontlighting compensation circuit 42 is referred to as "Va", the voltage from the buffer amplifier 40 as "vi", and the output signal from the adder 60 as "vi'". When the backlighting/over-frontlighting compensation circuit 42 produces the backlighting compensation signal Va (Va< Vi), the adder 60 adds the voltage of the compensation signal Va to the output (light measuring signal) of the buffer amplifier 40. After the addition, the voltage Vi' changes to Vi'< Vi. Because the exposure control works so as to compensate for its lowered amount of Vi–Vi', the video signal level increases. In such a manner, the compensation for backlighting is carried out to prevent the subject from being blackened.

Conversely when the backlighting/over-frontlighting compensation circuit 42 produces an over-frontlighting compensation signal Va' (Va'> Vi), the adder 60 adds the voltage of the compensation signal Va' to the output (light measuring signal) of the buffer amplifier 40. After the addition, the voltage Vi' changes to Vi'> Vi. Since the exposure control works so as to compensate for its increased amount of Vi'–Vi, the video signal level lowers. Thus over-frontlighting compensation is effected.

It should be noted that though, in the construction of FIG. 9, the control is made by adding the voltages, it is needless to say that the electric current addition or any other methods may be used.

As has been described above, according to the invention, in an automatic exposure control device, the exposure is compensated to optimum in such a way that the image sensing plane is divided into a plurality of detecting areas, and the magnitude of the luminance component of the video signal obtained from each of these areas is detected and evaluated to discriminate the backlighting state or the over-frontlighting state of the image sensing plane while tracking a change of the position of the subject. Despite the use of the weighted light measurement method, no erroneous discrimination arises. Hence, in backlighting photography, and over-frontlighting photography, regardless of any photographic situations, the camera employing this device becomes capable of shooting with a correct exposure in all lighting conditions.

What is claimed is:

1. An exposure control device comprising:
    (a) light measuring means arranged to divide an image sensing plane into a plurality of blocks and to detect a luminance level of each block;
    (b) first detecting means for detecting a first light measurement value from luminance levels of the respective ones of n blocks constituting a central area including a central part of the image sensing plane from among said plurality of blocks;

(c) second detecting means for detecting a second light measurement value from the luminance levels of the respective ones of m blocks of surrounding part of said central area of the image sensing plane; and (d) correction means arranged to discriminate a photographing state on the basis of a difference and a ratio of said first measurement value and said second measurement value.

2. A device according to claim 1, wherein said discriminating means discriminates between a backlighting photographic state and an over-frontlighting photographic state, and wherein said compensating means supplies compensation information to said light measuring means in accordance with the photographic state discriminated by said discriminating means.

3. A device according to claim 2, wherein said discriminating means senses the distribution of luminance component levels within the image sensing plane to detect the levels of luminance components of a subject area and a marginal area of said subject area, and discriminates the photographic state by using difference information and ratio information of the level of the luminance component of said subject area and the level of the luminance component of said marginal area.

4. A device according to claim 3, wherein said discriminating means is arranged to be able to discriminate at least whether the photographic state is a backlighting photographic state, or an over-frontlighting photographic state, or a normal photographic state.

5. A device according to claim 1, wherein said first and second detecting means exclude a luminance level in a predetermined area in an upper portion of the image sensing plane from a computation.

6. A device according to claim 1, wherein said first light measurement value detected by said first detecting means is a luminance level of the lowest luminance level block among a plurality of blocks in the central area.

7. A device according to claim 6, wherein the second light measurement value detected by said second detecting means is an average luminance level among a plurality of blocks in said surrounding part.

8. A device according to claim 7, wherein said correction means judges the first light measurement value as a counterlight condition if $Y_{SUB}$ and $Y_{MIN}$ are respectively above a predetermined value, where $$Y_{SUB}=Y_{AVR}-Y_{MIN};\ Y_{EV}=Y_{AVR}/Y_{MIN};\ \text{and}$$

$Y_{MIN}$ is the first light measurement value, $Y_{AVR}$ is the second light measurement value, $Y_{SUB}$ is the difference between the first and second light measurement values and $Y_{EV}$ is the ratio between the first and second light measurement values.

9. An automatic exposure control device comprising:

(a) light measuring means for performing a weighted light measurement for a light measuring area set in a predetermined position within an image sensing plane;

(b) discriminating means for discriminating a photographic state by evaluating the distribution of luminance signal levels in each of a plurality of blocks set on the image sensing plane, said discriminating means being arranged to discriminate the photographing state on the basis of the difference and the ratio of a representative light measurement value of a central area in the image sensing plane and a representative light measurement value of an outside area of the central area; and (c) compensating means for compensating a light measurement control signal produced by said light measuring means in accordance with a discrimination result made by said discriminating means, wherein said compensating means is arranged such that a condition for transition to a compensation mode of compensating said light measurement control signal and a condition of releasing said compensation mode differ from each other.

10. A device according to claim 9, wherein said compensation mode is a mode of performing backlighting compensation.

11. A device according to claim 9, wherein said discriminating means excludes a luminance level in a predetermined area in an upper portion of the image sensing plane.

12. A device according to claim 9, wherein said discriminating means discriminates the photographic state from a difference and a ratio between a luminance level of a lowest luminance block among a plurality of blocks in the central area and an average luminance level in a plurality of blocks in the outside area.

13. A device according to claim 12, wherein said discriminating means judges the photographic state as a counterlight state if $Y_{SUB}$ and $Y_{MIN}$ defined below are respectively higher than a predetermined level, where $$Y_{SUB}=Y_{AVR}-Y_{MIN};\ Y_{EV}=Y_{AVR}/Y_{MIN};\ \text{and}$$

$Y_{MIN}$ is the light measurement value of the central area, $Y_{AVR}$ is the light measurement value of the outside area, $Y_{SUB}$ is the difference between the $Y_{MIN}$ and $Y_{AVR}$ light measurement values and $Y_{EV}$ is the ratio between the $Y_{MIN}$ and $Y_{AVR}$ light measurement values.

14. An exposure control device, comprising:

(a) exposure control means for effecting exposure control on the basis of an image pickup signal outputted from image pickup means;

(b) detecting means arranged to divide an image sensing plane into a plurality of blocks and to detect a luminance level of each block;

(c) first computing means for computing representative light measurement value of an object from luminance level informations of each of the n blocks at the central part of the image sensing plane among said plurality of blocks, according to a first computing algorithm;

(d) second computing means for computing a representative light measurement value of an outside part of the central part from the luminance level informations of each of n blocks located in the outside part according to a second computing algorithm which is different from said first computing algorithm;

(e) discriminating means for discriminating a photographing state on the basis of a ratio of outputs of said first and second computing means; and (f) correction means for correcting said exposure control means on the basis of a result of discrimination effected by said discriminating means.

15. A device according to claim 14, wherein said first and second computing means respectively exclude from a computation a luminance level in a predetermined area in an upper portion of the image sensing plane.

16. A device according to claim 14, wherein the light measurement value computed by said first computing means is a luminance level in the lowest luminance block among a plurality of blocks in the central area.

17. A device according to claim 16, wherein the light measurement value computed by said second computing means is the average luminance level of a plurality of blocks in the outside part.

18. A device according to claim 17, wherein said discriminating means judges the photographic state as a counterlight state if $Y_{SUB}$ and $Y_{MIN}$ are respectively higher than a predetermined level, where $$Y_{EV} = Y_{AVR}/Y_{MIN}; \ Y_{SUB} = Y_{AVR} - Y_{MIN}; \text{ and}$$

$Y_{MIN}$ is the light measurement value computed by said first computing means, $Y_{AVR}$ is the light measurement value computed by said second computing means, and $Y_{EV}$ is the ratio between the $Y_{MIN}$ and $Y_{AVR}$ light measurement values, and wherein said discriminating means computes the difference between $Y_{AVR}$ and $Y_{MIN}$.

19. An exposure control device, comprising:
    (a) detection means for detecting an image signal level in a plurality of areas in an image sensing plane;
    (b) mode setting means, having a plurality of exposure control modes, for detecting a photographic state corresponding to an output of the detection means and for selecting an exposure control mode corresponding to the detected photographic state;
    (c) control means for controlling the mode setting means for making different a switch-over condition for switch-over from a first exposure mode to a second exposure mode from a restoring condition for restoring from the second exposure mode to the first exposure mode by the mode setting means.

20. A device according to claim 19, wherein said detecting means comprises first detecting means for detecting a minimum value of the image signal level in the plurality of blocks at a central portion of the image sensing plane and second detecting means for detecting an average value of image signal levels in the plurality of blocks in a surrounding portion of the central portion, and the mode setting means computes outputs of the first detecting means and the second detecting means to detect the photographic state.

21. A device according to claim 20, wherein said mode setting means selects an exposure control mode on the basis of the following conditions:

$$Y_{SUB} = Y_{AVR} - Y_{MIN}; \ Y_{EV} = Y_{AVR}/Y_{MIN}; \text{ and}$$

where $Y_{MIN}$ is the detection result of the first detection means and $Y_{AVR}$ is the detection result of the second detection means.

22. A device according to claim 21, wherein said first exposure control mode is for performing an ordinary exposure control, said second exposure mode is a counterlight correction mode, and said mode setting means judges a counterlight state if $Y_{SUB}$ and $Y_{MIN}$ are respectively higher than a predetermined level and switches the mode to the second exposure mode, and if only $Y_{SUB}$ in the second mode is lower than the predetermined level restores the mode to the first exposure mode.

23. An exposure control device for controlling exposure according to an image signal level, comprising:
    (a) exposure control means for performing exposure control so as to cause the image signal level to reach a predetermined value;
    (b) detection means for detecting image signal levels in a plurality of areas on an image sensing plane;
    (c) discrimination means for discriminating a predetermined photographic state on the basis of an output of the detection means,
    (d) correction means for correcting an operation of the exposure control means when the predetermined photographic state is discriminated by the discrimination means, and
    (e) control means for making an operation condition for an execution of a correction operation of the correction means different from a condition for an execution of a release of the correction operation of the correction means.

24. A device according to claim 23, wherein said detection means comprises first detecting means for detecting a minimum value of the image signal level in a plurality of blocks at a central portion of the image sensing plane and second detecting means for detecting an average value of image signal levels in a plurality of blocks in a surrounding portion of the central portion, and computes outputs of the first and second detecting means for discriminating the photographic state.

25. A device according to claim 24, wherein said control means controls an operation and non-operation of the correction means on the basis of the following conditions:

$$Y_{SUB} = Y_{AVR} - Y_{MIN}; \ Y_{EV} = Y_{AVR}/Y_{MIN}; \text{ and}$$

$Y_{MIN}$ is the detection result of the first detecting means and $Y_{AVR}$ is the detection result of the second detecting means.

26. A device according to claim 25, wherein if $Y_{SUB}$ and $Y_{MIN}$ are respectively higher than a predetermined level, a counterlight state is discriminated and the control means causes the correction means to perform counterlight correction, and releases the operation of the correction means only if $Y_{SUB}$ is lower than the predetermined level during the counterlight correction being performed by the correction means.

\* \* \* \* \*